(12) United States Patent
Tonkovich et al.

(10) Patent No.: US 8,869,830 B2
(45) Date of Patent: Oct. 28, 2014

(54) FLOW DISTRIBUTION CHANNELS TO CONTROL FLOW IN PROCESS CHANNELS

(75) Inventors: Anna Lee Tonkovich, Dublin, OH (US); Ravi Arora, New Albany, OH (US); David Kilanowski, Dublin, OH (US)

(73) Assignee: Velocys, Inc., Plain City, OH (US)

( * ) Notice: Subject to any disclaimer, the term of this patent is extended or adjusted under 35 U.S.C. 154(b) by 0 days.

(21) Appl. No.: 13/304,279

(22) Filed: Nov. 23, 2011

(65) Prior Publication Data

US 2012/0138151 A1   Jun. 7, 2012

Related U.S. Application Data

(62) Division of application No. 11/738,456, filed on Apr. 20, 2007, now abandoned.

(60) Provisional application No. 60/745,614, filed on Apr. 25, 2006.

(51) Int. Cl.

| | | |
|---|---|---|
| F28D 1/047 | (2006.01) | |
| F28F 1/10 | (2006.01) | |
| B01F 5/06 | (2006.01) | |
| B01F 5/04 | (2006.01) | |
| B01F 3/08 | (2006.01) | |
| B01F 13/00 | (2006.01) | |
| B01J 19/00 | (2006.01) | |
| F28F 9/02 | (2006.01) | |

(52) U.S. Cl.
CPC .... *B01J 19/0093* (2013.01); *B01J 2219/00873* (2013.01); *F28F 2260/02* (2013.01); *B01F 5/0646* (2013.01); *B01F 5/0475* (2013.01); *B01F 3/0807* (2013.01); *B01J 2219/00891* (2013.01); *B01J 2219/00783* (2013.01); *B01J 2219/00869* (2013.01); *B01J 2219/00835* (2013.01); *B01F 13/0059* (2013.01); *B01F 5/0655* (2013.01); *B01J 2219/00889* (2013.01); *B01J 2219/0086* (2013.01); *F28F 9/0275* (2013.01); *B01F 5/0647* (2013.01)
USPC ... 137/561 A; 137/340; 422/200; 165/104.21; 165/153; 165/174

(58) Field of Classification Search
CPC ......... F28F 1/022; F28F 3/04; F28F 2260/02; F28D 1/0316; F28D 1/0341
USPC .............. 137/561 A, 340; 422/198, 200, 211; 165/153, 166, 174, 177, 104.21
See application file for complete search history.

(56) References Cited

U.S. PATENT DOCUMENTS

| | | |
|---|---|---|
| 3,847,211 A | 11/1974 | Fischel et al. |
| 4,041,591 A | 8/1977 | Noll et al. |

(Continued)

FOREIGN PATENT DOCUMENTS

| | | |
|---|---|---|
| EP | 1506054 B1 | 10/2003 |
| EP | 1398049 A1 | 3/2004 |

OTHER PUBLICATIONS

Kosar A, Kuo CJ, Peles, Y, "Suppression of Boiling Flow Oscillations in Parallel Microchannels by Inlet Restrictors", Journal of Heat Transfer, 2006, vol. 128, pp. 251-260.

(Continued)

*Primary Examiner* — Atif Chaudry
(74) *Attorney, Agent, or Firm* — Frank Rosenberg

(57) ABSTRACT

The invention describes features that can be used to control flow to an array of microchannels. The invention also describes methods in which a process stream is distributed to plural microchannels.

19 Claims, 21 Drawing Sheets

(56) References Cited

U.S. PATENT DOCUMENTS

| | | | |
|---|---|---|---|
| 4,282,927 | A | 8/1981 | Simmons |
| 4,343,354 | A | 8/1982 | Weber |
| 4,401,155 | A | 8/1983 | Royal et al. |
| 5,000,253 | A | 3/1991 | Komamicki |
| 5,482,680 | A | 1/1996 | Wilkinson et al. |
| 5,544,700 | A | 8/1996 | Shagoury |
| 5,915,469 | A | 6/1999 | Abramzon et al. |
| 6,098,706 | A | 8/2000 | Urch |
| 6,244,333 | B1 | 6/2001 | Bergh et al. |
| 6,293,338 | B1 | 9/2001 | Chapman et al. |
| 6,508,862 | B1 | 1/2003 | Tonkovich et al. |
| 6,537,506 | B1 | 3/2003 | Schwalbe et al. |
| 6,572,830 | B1 * | 6/2003 | Burdon et al. ........... 422/186.29 |
| 6,637,463 | B1 | 10/2003 | Lei |
| 7,122,156 | B2 | 10/2006 | Bergh et al. |
| 7,190,580 | B2 | 3/2007 | Bezama et al. |
| 7,422,910 | B2 | 9/2008 | Fitzgerald et al. |
| 7,485,671 | B2 | 2/2009 | Qiu et al. |
| 7,537,739 | B2 | 5/2009 | Haas |
| 7,610,775 | B2 | 11/2009 | Tonkovich |
| 2002/0031471 | A1 | 3/2002 | Tonkovich et al. |
| 2002/0106311 | A1 | 8/2002 | Golbig et al. |
| 2002/0125001 | A1 | 9/2002 | Kelly et al. |
| 2002/0187090 | A1 | 12/2002 | Vanden Bussche et al. |
| 2003/0027354 | A1 | 2/2003 | Geli |
| 2003/0043544 | A1 | 3/2003 | Nelson et al. |
| 2003/0062149 | A1 | 4/2003 | Goodson et al. |
| 2003/0075491 | A1 | 4/2003 | Griffiths |
| 2003/0118486 | A1 | 6/2003 | Zhou et al. |
| 2003/0173650 | A1 | 9/2003 | Larsson et al. |
| 2004/0013585 | A1 * | 1/2004 | Whyatt et al. ................ 422/189 |
| 2004/0033455 | A1 | 2/2004 | Tonkovich et al. |
| 2004/0076562 | A1 | 4/2004 | Mazanec et al. |
| 2004/0104010 | A1 | 6/2004 | Kenny et al. |
| 2004/0234566 | A1 | 11/2004 | Qiu et al. |
| 2005/0133457 | A1 | 6/2005 | Tonkovich et al. |
| 2006/0204826 | A1 | 9/2006 | Borchers |
| 2006/0275185 | A1 | 12/2006 | Tonkovich et al. |
| 2007/0085227 | A1 | 4/2007 | Tonkovich et al. |

OTHER PUBLICATIONS

Kandlikar SG, "Fundamental issues related to flow boiling in minichannels and microchannels", Experimental Thermal and Fluid Science 26 (2002) 389-407.

Lee HJ, Yao SC, "System instability of evaporative micro-channels", International Journal of Heat and Mass Transfer 53 (2010) 1731-1739.

Wang G, Cheng P, Bergles, AE, "Effects of inlet/outlet configurations on flow boiling instability in parallel microchannels", International Journal of Heat and Mass Transfer 51 (2008) 2267-2281.

English translation of the office action from the Chinese patent office on patent application # 200780014720.1 mailed on Jul. 13, 2011.

English translation of the office action from the Japanese patent office on patent application # 2009507808 mailed on Feb. 21, 2012.

International search report for PCT/US2007/010162 with the issuance date of Oct. 28, 2008.

\* cited by examiner (a)          (b)

US 8,869,830 B2

FLOW DISTRIBUTION CHANNELS TO CONTROL FLOW IN PROCESS CHANNELS

RELATED APPLICATIONS

This application is a divisional of U.S. patent application Ser. No. 11/738,456 filed Apr. 20, 2007, now abandoned. In accordance with 35 U.S.C. sect. 119(e), this application claims priority to provisional patent application Ser. No. 60/745,614 filed 25 Apr. 2006.

GOVERNMENT RIGHTS

This invention was made with Government support under contract DE-FE36-04GO14271 awarded by the United States Department of Energy. The government has certain rights in the invention.

FIELD OF THE INVENTION

This invention relates to flow control in microchannel devices.

INTRODUCTION

Many microchannel devices contain numerous planar, parallel process microchannels. Controlling flow from a manifold or manifolds into these parallel process microchannels has been a major challenge of scaling up microchannel devices. Examples of techniques to control flow (and typically to equalize flow) in parallel process microchannels have been described by Fitzgerald et al. in U.S. Published Patent Application Nos. 2005/0087767 and 2006/0275185, both of which applications are incorporated herein as if reproduced in full below. Although these publications provide very useful techniques for controlling flow, there remain some instances in which simpler devices or devices suitable for use with greater manufacturing tolerances or greater operability under a range of conditions may be desired.

The prior art includes numerous examples of mixing devices that divide and reunite flows through microchannels; for example, U.S. Pat. No. 6,845,787. These patents do not provide suitable means for controlling flow from a manifold in to an array of parallel process channels.

SUMMARY OF THE INVENTION

Flow distribution in microchannel reactors, separators, and other unit operations may require sufficiently uniform flow distribution for many tens, or hundreds, or thousands of channels. To achieve this sufficiently uniform flow distribution, that is typically characterized by a quality index less than 30%, or less than 20%, or more preferably less than 10%, or most preferably less than 5 or even 1% or less, flow distribution features (also called flow distribution channels (FDCs)) are used to distribute flow. In some flow distribution features, frictional losses can be the primary cause of pressure drop (for example, more than 50%, preferably 70%, more than 90% of losses through the features can be frictional losses). In this invention, orifices and porous plugs are not flow distribution features. Flow distribution channels are introduced either upstream or downstream, but preferably upstream, of connecting microchannels where a unit operation is performed. The flow distribution channels utilize a pressure drop that is higher than the pressure drop in the connecting channels (that is, over the entire length of the connecting channels), preferably by at least 25%, or 50%, or more preferably 2× or 4× or higher. The instability in time and/or variation in pressure drop in the connecting channels where the unit operation is occurring is mitigated from affecting the overall flow distribution to many parallel microchannels.

In this invention the pressure drop through the flow distribution features is preferably greater than through the connecting channels. In contrast, flow through orifices is controlled by expansion and contraction (not primarily frictional losses). The invention includes both methods of controlling flow as well as apparatus and/or designs of apparatus (preferably the apparatus is microchannel apparatus where each connecting (i.e., process) channel has at least one internal dimension of 1 cm or less, preferably 2 mm or less). A set of connecting channels comprises at least 2, preferably at least 5, more preferably at least 10 parallel channels connected to a common header and/or footer.

In one aspect, the invention provides a method of fluid processing, comprising: passing a process stream into a manifold and a process stream. Flow distribution channels FDCs connect the manifold and process channels. The manifold is connected to at least a first flow distribution channel (FDC) and a second FDC. Each of these FDCs comprises a series of turns, comprising at least four turns that are 90° or less, or comprising at least two turns that are greater than 90°. The first FDC channel connects the manifold to a first process channel; and the second FDC channel connects the manifold to a second process channel. The portion of the process stream that flows through the first FDC connects with only one process channel and does not connect with any other FDC so that all of the portion of the process stream that enters the first FDC flows into the first process channel. A unit operation (which can be the same or different) is conducted in the first and second process channels.

In a further aspect, the invention provides a microchannel device, comprising:
a manifold; wherein the manifold is connected to at least a first FDC and a second FDC; wherein each FDC comprises a series of turns, comprising at least four turns that are 90° or less, or comprising at least two turns that are greater than 90°; and wherein the first FDC channel connects the manifold to a first process channel; wherein the second FDC channel connects the manifold to a second process channel; and wherein the first FDC connects with only one process channel and does not connect with any other FDC so that all of the portion of the process stream that enters the first FDC flows into the first process channel.

In another aspect, the invention provides a method of distributing flow from a manifold into plural process channels, comprising: passing a process stream into a manifold; wherein the manifold is connected to at least a first FDC and a second FDC; wherein each FDC comprises a series of turns, comprising at least four turns that are 90° or less, or comprising at least two turns that are greater than 90°; wherein the first FDC channel connects the manifold to a first process channel; and wherein the second FDC channel connects the manifold to a second process channel. In this aspect, the first FDC channel is on the same plane as the first process channel, and the first FDC has a cross-sectional area which, at all points, is less than the cross-sectional area of the first process channel. "On the same plane" means that process stream remains within the same layer in both the FDCs and the process channels—it does not flow out of the layer and then back into the layer. Cross-sectional area is measured perpendicular to bulk flow. In a preferred embodiment, the first FDC channel is on the same plane as the first process channel and the manifold.

Similarly, the invention provides a microchannel device, comprising:

a manifold; wherein the manifold is connected to at least a first FDC and a second FDC; wherein each FDC comprises a series of turns, comprising at least four turns that are 90° or less, or comprising at least two turns that are greater than 90°; wherein the first FDC channel connects the manifold to a first process channel; wherein the second FDC channel connects the manifold to a second process channel; and wherein the first FDC channel is on the same plane as the first process channel. "On the same plane" means that process stream remains within the same layer—it does not flow out of the layer and then back into the layer. The invention also includes a prebonded (or post-bonded) assembly that comprises a stack of sheets with this configuration.

In a further aspect, the invention provides a process of combining fluids, comprising: passing a first fluid through a process channel; passing a second fluid through a FDC and into the process channel where the first and second fluids combine, where the FDC comprises a series of turns, comprising at least four turns that are 90° or less, or comprising at least two turns that are greater than 90°. In this aspect, the first and second fluids are different. In a preferred embodiment the mass flow rate of the first fluid into the process channel is 5% or less (in some embodiments 1% or less, or 0.1% or less) than the flow rate of the second fluid in the process channel. In some preferred embodiments, a layer comprising an array of parallel process channels are connected to one or more added fluid channels by a plurality of FDCs. An array of added fluid channels can be in a parallel layer. For example, using this process, emulsions can be formed by passing a continuous phase through process channels in a first layer and dispersed phase through a second layer. In some embodiments, the numbers of process channels are 5×, 10×, 20×, 100× greater than the number of channels for the added fluid.

In a related aspect, the invention provides apparatus for combining fluids, comprising: a process channel; an added fluid channel; and a FDC connecting the added fluid channel to the process channel, where the FDC comprises a series of turns, comprising at least four turns that are 90° or less, or comprising at least two turns that are greater than 90°.

In a further aspect, the invention provides a method of fluid processing, comprising: passing a process stream into a manifold; wherein the manifold is connected to at least a first flow distribution channel (FDC) and a second FDC; wherein the first FDC comprises a first portion having a single channel, a second portion that is connected to the first portion at one end and a first process channel at another end, and a third portion that is connected to the first portion at one end and a second process channel at another end; wherein the second FDC comprises a first channel portion having a single flow path, a second channel portion that is connected to the first channel portion at one end and a third process channel at another end, and a third channel portion that is connected to the first channel portion at one end and a fourth process channel at another end; wherein each FDC portion comprises a series of turns, comprising at least four turns that are 90° or less, or comprising at least two turns that are greater than 90°; and conducting a unit operation in the first, second, third and fourth process channels.

In preferred embodiments of any of the methods or apparatus described herein, the FDCs can have a serpentine shape with, for example, an angle of at least 135°. In another preferred embodiment, the process stream is partially boiled as it passes through one or more of the process channels. For example, 0.5 to 50% of fluid in a process channel can boil.

The inventive methods are especially useful for applications in which the process stream in the process channel comprises an emulsion, a dispersion, or a non-Newtonian fluid. For example, in the method described above, the first process channel may have channel walls with orifices and a first fluid comprising a first phase passes through the first process channel and a second fluid, which is immiscible in the first fluid, passes through the orifices into the first fluid to form an emulsion. The second fluid could pass through a FDC for controlled flow into the process stream. The inventive methods are especially useful for applications in which flow through the FDCs is Newtonian and flow in (preferably straight) process channels is non-Newtonian. In some embodiments, plural FDCs, that connect a manifold with plural parallel process channels, have the same length and/or same number of turns. The manifold can be a header or footer. In some preferred embodiments, the FDCs can be planar and can be formed, for example, by etching or stamping patterns (such as serpentine patterns) in a sheet. Preferably, pressure drop in the FDCs is greater than through the process channels. In some preferred embodiments, a FDC comprises at least 4 or at least 8 turns. In some embodiments, one FDC has only one connection to a manifold and one connection to a process channel. It is also possible for a FDC to branch into separate sub-FDCs; for purposes of the present invention, these are termed FDC portions. The fluids are not limited, in some embodiments, liquids, gases or both are processed. The FDCs can have turns of the same angle or turns of varying angles within the same FDC.

Any of the apparatus described herein may alternatively be described in terms of pre- or post-bonded assemblies of sheets; or chemical systems comprising apparatus with fluid streams in the apparatus.

An important advantage of various aspects of the invention are the compact devices that are achievable. Preferably, the distance from a manifold to a process channel is less than length of process channel; more preferably, the length of a process channel is at least 2×, 4×, or 10× greater than the distance from the manifold to the process channel. In some embodiments, the width of a process channel is at least 3× greater than its height and the FDC or FDCs connected to the process channel (and preferably also the connected manifold) share a plane in the width direction. Preferably, the area of FDCs on a device (or volume of FDCs in a device) is less than the area (or volume) of process channels; preferably at least 10 times less. In some embodiments, the cross-section of plural (or all) FDCs connected to a manifold or within a layer are the same.

Some nonlimiting examples of applications for the invention include: phase change, such as boiling or condensation either in full or part, multiphase mixing applications, reactions comprising oxidations, hydrogenations, sulfonations, nitrations, reforming, or any other reactions, formation of emulsions or dispersions, or other mixing applications, separations including distillation, absorption, adsorption, phase separation, among others. This novel approach may be used to manifold heat transfer fluids to any unit operation, including those that only include heat transfer.

The inventive features can also serve to reduce the volume in the headers and or footers of a system. By this manner they serve to reduce the dead volume for applications that require fast transient response such as adsorption or others that are required to respond to transient changes in input parameters in a fast manner. The features also serve to reduce dead volume that may act to increase dispersion in a process such as that which broadens a residence time distribution for the formation of products from selective reactions including oxidations, nitrations, hydrogenations, solids forming reactions, emulsion formation devices and others.

GLOSSARY

As is standard patent terminology, "comprising" means "including" and neither of these terms exclude the presence of additional or plural components. For example, where a device comprises a lamina, a sheet, etc., it should be understood that the inventive device may include multiple laminae, sheets, etc.

A "header" is a manifold arranged to deliver fluid to connecting channels.

A "height" is a direction perpendicular to length. In a laminated device, height is the stacking direction.

A "hydraulic diameter" of a channel is defined as four times the cross-sectional area of the channel divided by the length of the channel's wetted perimeter.

A "laminated device" is a device made from laminae that is capable of performing a unit operation on a process stream that flows through the device.

A "length" refers to the distance in the direction of a channel's (or manifold's) axis, which is in the direction of flow.

A "microchannel" is a channel having at least one internal dimension (wall-to-wall, not counting catalyst if present) of 10 mm or less (preferably 2.0 mm or less) and greater than 1 μm (preferably greater than 10 μm), and in some embodiments 50 to 500 μm. Microchannels are also defined by the presence of at least one inlet that is distinct from at least one outlet.

Microchannels are not merely channels through zeolites or mesoporous materials. The length of a microchannel corresponds to the direction of flow through the microchannel. Microchannel height and width are substantially perpendicular to the direction of flow of through the channel. In the case of a laminated device where a microchannel has two major surfaces (for example, surfaces formed by stacked and bonded sheets), the height is the distance from major surface to major surface and width is perpendicular to height.

Figure 1:
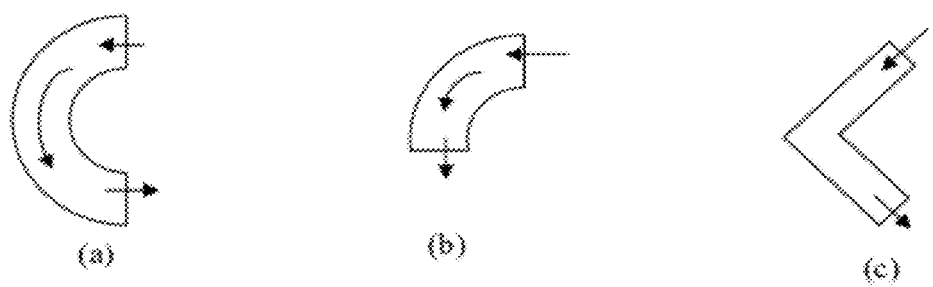
FIG. 1 illustrates examples of turns.

A "turn" is defined as a fluid pathway with length greater than the hydraulic diameter of the channel, which leads to a change in the direction of fluid flow by more than 10° (more preferably by at least 90°, more preferably by at least 135°, and in some embodiments by about 180°), using the initial direction of flow as the reference. FIG. 1 shows examples of a turn. An angle of the turn is defined as the angle subtended between the fluid flow direction at the inlet of the turn and at the outlet of the turn. The subtended angle is preferably less than or equal to 180°. FIG. 1(a) shows a turn with an angle of 180°. FIG. 1(b) shows a turn with a subtended angle of 90°. FIG. 1(c) also shows a turn with subtended angle of 90°.

Figure 2:
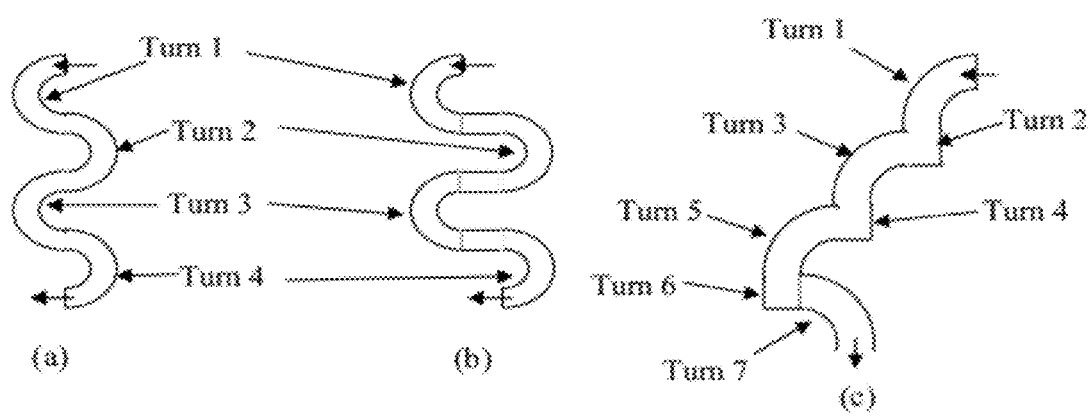
FIG. 2 illustrates examples of simultaneous turns forming flow distribution features.

FIG. 2 shows examples of multiple turns joined together to form a fluid path way for a flow distribution feature. FIG. 2(a) shows an example of four turns in series, each turn subtending an angle of 180° to form a flow distribution feature. FIG. 2(b) shows four turns, each turn subtending 180° but are separated by straight sections. FIG. 2(c) also shows 7 turns in series, each turn subtending an angle of 90°. The change in the direction of fluid flow between two turns is not counted as a turn because the length of the turn is less than the hydraulic diameter of the channel. Also, for a curve segment to be a "turn" it must a change in the derivative of slope, such as illustrated in FIG. 2(c); a semi-circle constitutes only one 180° turn, not an arbitrary number of smaller turns.

Figure 3:
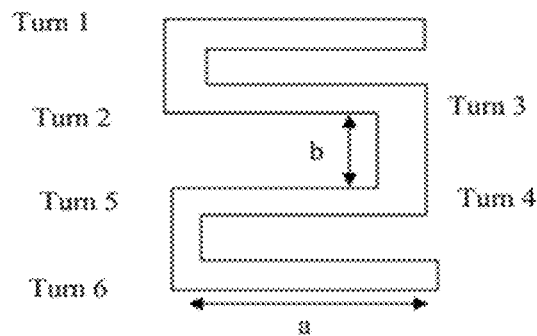
FIG. 3 shows combinations of turns.

FIG. 3 shows an example where two turns can be combined to call as a single turn for simplicity. In FIG. 3, if dimension "a" is two times of more than dimension "b", the turn 3 and turn 4 can be combined together to form one turn.

Preferred embodiments of the invention comprise at least 3 turns, in some embodiments at least 6 turns, and in some embodiments 3 to 15 turns. In some embodiments, turns are configured to have a serpentine shape.

Turns may also be accomplished by a change in direction within a single shim or by changing direction from shim to shim. For example, a flow path may proceed for a certain distance in one shim and then move to a new layer, constituting a 90° turn, and continue within the second shim at substantially the same angle as the initial shim or at a new angle.

"Unit operation" means chemical reaction, vaporization, compression, chemical separation, distillation, condensation, mixing (including forming emulsions), heating, or cooling. A "unit operation" does not mean merely fluid transport, although transport frequently occurs along with unit operations. In some preferred embodiments, a unit operation is not merely mixing.

DETAILED DESCRIPTION OF THE INVENTION

The flow distribution channels may be any physical geometry and orientation but are preferably characterized by at least one dimension (and preferably a hydraulic diameter) that is smaller than the connecting channels (in this application, the term "connecting channels" is synonymous with "process channels") such that the pressure drop for a given flow rate is higher in the distribution channels than in the connecting channels. One example geometry of the distribution channels is an array of serpentine features connected to an array of connecting channels. The serpentine features may have a channel gap equal to either the thickness of a shim (for example, stamped or etched-through features in a sheet), or a channel gap (also called channel height, because it is in the stacking direction of a laminated device) that is less than the shim thickness in the case of partially etched features. The width or span of the flow distribution features may be less than the width or span of the connecting channel. The distribution channels in one embodiment may be serpentine so as to increase their effective length of the flow passage while minimizing the volume of the manifold region overall relative to the volume of the connecting channels. In some embodiments, it is preferred to have a manifold within a microcomponent that has a volume less than 100% of the volume of the set of connecting channels, and more preferably less than 20% of the volume of the connecting channels.

The serpentine features can be in a single shim; that is, a single plane. Other embodiments of the flow distribution features, including serpentine or other shaped features, may traverse multiple layers in a manner that moves the flow back and forth from layer to layer in a laminated device. For this embodiment, more than one shim is required. The connecting channels can be in a single shim or plural shims. Unlike gates and grates that have previously described in examples of an earlier disclosure, in this case pressure drop through the features traversing plural sheets preferably is greater than the pressure drop through the connecting channels.

A flow distribution feature preferably have heights of 50 mm or less, more preferably 10 mm or less, more preferably 5 mm or less, in some embodiments heights in the range from 0.005 to 10 mm, in some embodiments at least 0.05 mm, and widths preferably of 2 mm or less, in some embodiments in the range from 0.05 to 1 mm, and in some embodiments 0.25 mm or less. The heights and widths are typically perpendicular to flow of fluid in the channels. In some embodiments, the cross-sectional area of the flow distribution features is about 100 times smaller than the cross-sectional area of processing channel. In some embodiments the cross-sectional are of the flow distribution features is at least 2, or at least 10, or at least 50 times smaller than the cross-sectional area of processing channel.

Figure 4:
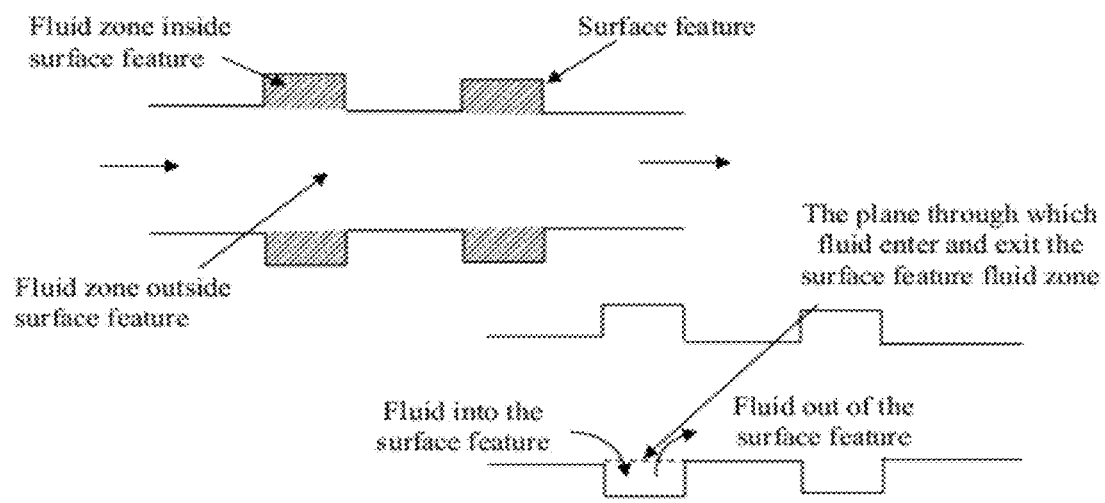
FIG. 4 illustrates fluid zones and flow exchange in surface features.

The flow distribution features are different than what are termed "surface features" in the patent literature. Surface features are depressions or protrusions on the channel wall. A channel with surface features has two fluid zones: fluid zone inside the surface features and fluid zone outside the surface feature which can also be termed as main channel zone as shown in FIG. 4. FIG. 4 shows the cross-sectional view of a channel with surface features. The flow between these fluid zones is substantially exchanged in a channel with surface feature. The fluid in the main channel enters and exits the surface channel fluid zone from the same plane as shown in FIG. 4. However in flow distribution features, there is generally only one fluid zone. If other fluid zones are created, e.g. recirculation zones at the corners, the fluid is not substantially exchanged between the recirculation zones. The fluid enters the flow distribution feature at one plane and exits the flow distribution feature from another plane.

Flow distribution channels can be planar (i.e., in a single layer) or can have a three dimensionally tortuous path through multiple layers that preferably creates a resistance to flow that is greater than the resistance in the connecting channels where the unit operation is occurring.

The flow distribution channels may be constructed using any method for constructing microchannel devices described in the art. One embodiment includes etching or cutting of thin sheets of material, which are stacked and joined. The invention also includes the assemblies of stacked sheets (i.e., pre-bonded or bonded stacks of sheets).

The use of distribution channels ameliorates the uncertainty in flow that may occur from variations in the final dimensions of the connecting channel where the unit operation occurs. Variations may result from the introduction of a catalyst, the performance of a catalyst, multiphase mixtures, the formation of non-Newtonian mixtures, the formation of bubbles or any phase transformation. Multiphase contacting including reactions may also be particularly advantaged by this approach, where the pressure drop for either of the phases, gas-liquid, or liquid-liquid may be hard to predict or transient in nature or other non regular mechanisms. The use of distribution features is also useful for embodiments where the same apparatus is used for multiple processes or to make multiple products.

The use of distribution features is especially useful for processes where the fluid physical properties change significantly (more than 20%, preferably more than 50%) along the length of the connecting channel or process channel. Examples of fluid physical properties that can change along the length of the process channel include the fraction of one immiscible phase in another phase (e.g. liquid-liquid processes, liquid-gas processes, liquid-solid processes, and the like), changes in viscosity, changes in fluid density, and other physical property changes.

The flow distribution features desirably create a pressure drop between the fluid and wall that are higher (for example, >2x, >5x, or even >10x) than the pressure drop of the process channel. As such, the restriction in the flow distribution features maintains a nearly uniform flow distribution between all the channels, where the quality index (defined below) is less than 30%, or more preferably less than 15%, and more preferably less than 10%, more preferably less than 5%, and most preferably 1% or less. In some embodiments, the pressure drop in the process channels is on the order of 0.01 psi to 1 psi for flow lengths in the range of 1 to 50 cm for a residence time from 0.1 sec to 10 seconds. In some embodiments, the pressure drop in the flow distribution features is on the order of 0.1 to 10 psi. In some embodiments, the pressure drop in the flow distribution features is on the order of 1 to 100 psi.

$$Q = \frac{\dot{m}_{max} - \dot{m}_{min}}{\dot{m}_{max}} \times 100$$

Where $\dot{m}_{max}$=Maximum mass flow rate in the channel, kg/s
$\dot{m}_{min}$=Minimum mass flow rate in the channel, kg/s
Q=Quality index Partial boiling is one application that is particularly advantaged by the use of distribution channels, where the high pressure drop is achieved with a single phase fluid that is subcooled from the boiling temperature. As boiling is initiated, the pressure drop in the connecting microchannel may vary locally from channel to channel with the onset of boiling and as such a means for regulating flow to each channel is preferred.

It may also be preferred to tailor the flow distribution within an array of channels, such that more flow is preferentially metered to the top of the reactor where the heat load or flux is the highest and minimized near the end of the reactor.

The distribution channels may be used for single phase unit operations or for multiphase unit operations or any combination therein. The distribution channels may be used to precisely meter reactants that are used to form particles in connecting channels.

The distribution channels are particularly useful when there is a non-Newtonian fluid flowing through the connecting channels, because the flow distribution features mitigate the effect of the fluid changing apparent viscosity with changing conditions. For example, the connecting channels may involve a changing apparent viscosity of the flowing fluid due to polymerization, formation of an emulsion, formation of solids, changing temperature, pressure, local velocity, etc. through changes in the microchannel configuration or materials used in the channel. The flow distribution features provide a robust design for mitigating the effect of these variations on flow distribution. Preferably, non-Newtonian flow is restricted to flow through straight channels. In a preferred embodiment, a fluid stream flowing through the flow distribution features is Newtonian, and then becomes non-Newtonian in the connecting channels (for example, due to a composition change). This could occur, for example, where flow is occurring in a process channel and a second phase enters the process channel through orifices.

The flow distribution features may also be used to tailor the addition of one reactant into a second reactant, such as in a selective oxidation. The features could be used to provide sufficient restriction to an oxidant or other reactant such that the flow is metered in an even, or alternatively, a tailored, fashion along the length of a reactor as desired. In this manner, the metering function, namely the flow distribution channels, may be separate from an inlet within a reactor such that an application of a coating such as a catalyst will be less likely to plug or foul when the coating is applied.

The distribution channels may be preferentially disposed within a manifold section of a device such that once the fluid enters the flow distribution channels it may only exit to one process channel and not undergo additional redistribution. As an example, one flow distribution channel could create a conduit that feeds a single channel an oxidant (or other reactant or fluid) to a single introduction point within a single microchannel, while a second and perhaps third or more distribution channels feeds an oxidant (or other reactant or fluid) to second or third or more introduction points along the length of a microchannel reactor or other unit operation. The distribution function in the form of the distribution channels is removed or physically separated from the unit operation.

Distribution channels may also be used for small scale or large scale applications. The distribution channels may be helpful to meter flows for a variety of applications including fuel cells, including low power fuel cells or fuel processors, microfluidics, blood or fluid analysis or other applications where metering flows is especially challenging. Distribution channels may be used to meter flows for any microchannel or microfluidics application.

One advantage of the use of distribution channels is for improving flow distribution not only for a fixed condition or design point, but also during turn up and turn down of a unit operation or process. Specifically, the flow distribution may vary less than 20%, or less than 10% or less than 5% in the absolute overall quality index factor when the flow is turned down by 50% or turned up by 20% over a selected design point. In an alternative embodiment, the distribution features allow the turn up and turn down of a device to vary up to +50% to −80%. In a third embodiment the novel distribution features allow for a turn down of −95% and a turn up of 200% over the nominal operating design point for a multichannel unit operation that includes more than 10 channels operating in parallel to achieve a target capacity.

In an alternative embodiment, a first set of distribution channels may be used upstream of the connecting channels while a second set of distribution channels may be used downstream or alternatively at any point in between to tailor both the magnitude of the mass flowrate in any given channel and the absolute pressure in the channel. This approach may be particularly advantageous for tailoring flowrate and the temperature for an application where partial boiling may create temperatures that are different at different axial locations along the length of the reactor.

In some preferred embodiments, flow distribution features are used to distribute fluids (including gases) at flow rates exceeding 1 mL/min per flow distribution channel. Alternate examples for the use of the inventive distribution channels are for lab on a chip or microfluidic applications, where low flows are metered to at least two or more channels or to at least two or more locations along the length of a channel. Metering low flowrates is particularly challenging to control, especially with very modest changes in channel dimensions from normal manufacturing tolerances.

Another example application is for the production of hydrogen peroxide that may include a catalytic reaction, such as hydrogenation, and/or a non-catalytic reaction, such as oxidation, where two streams must be metered into each other at preferred ratios. There may be strict requirements for the local concentration of the at least two or more reactants at any location in the reactor. The reaction may not be catalyzed in one reaction, such as the oxidation of an anthraquinone-based working solution used in the production of hydrogen peroxide.

An alternate embodiment for this invention is the metering of a small flow-through flow distribution features into a large flow, such as the use of a promoter, additive, fluid catalyst, active ingredient, pigment, preservative, fragrance, or other species that comprises less than 20% or in some embodiments less than 5% or less than 0.01%, and/or at least 0.001% of the mass of the larger flow stream.

An alternate embodiment for this invention is for micromixers of two or more fluid streams, including gas/gas, gas/liquid, liquid/liquid, gas or liquid into a fluid that comprises a solid or biphasic mixture. In other preferred embodiments, the flow distribution features are used for unit operations other than mixing, such as heat exchange. In some embodiments, a serpentine flow distribution feature does not mix fluids. In some preferred embodiments, the length of connecting channels is at least 3 times, preferably 5× and in some embodiments at least ten times longer than the flow distribution features to which the channels are connected.

Flow Distribution Feature Designs

The manifold for the processes having small pressure drop in the connecting microchannels (less than or equal to pressure drop in the main manifold section) could be challenging. A small change in the manifold pressure profile can lead to large mal-distribution in the connecting microchannels. Generally the size of the manifold for such processes would be large for a uniform flow distribution. A common method of reducing the manifold dimensions while achieving uniform flow distribution for such a process is by using orifices between the manifold and the connecting microchannels. However the pressure drop through an orifice varies as (Velocity)$^n$, where n>1. Therefore a design with orifices for connecting microchannels with small pressure drop is sensitive to the manifold flow rates and may not provide a good flow distribution if the flow rate is changed. The flow mal-distribution may cause poor performance of the microchannel device. In summary, the manifold may not provide uniform distribution at scale up and scale down flow conditions.

Figure 5:
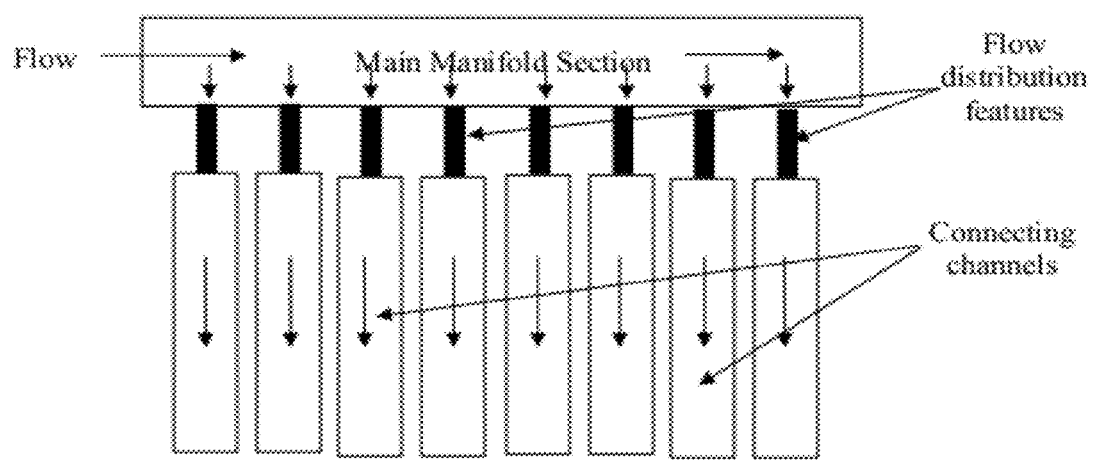
FIG. 5 illustrates the location of some flow distribution features.

A flow distribution feature is preferably a micro-dimension channel (having at least one dimension of 1 cm or less, more preferably at least one dimension of 2 mm or less) connecting main manifold section to the connecting (process) microchannel as shown in FIG. 5. The dimensions of a flow distribution feature, flow cross-sectional area and length, are preferably smaller than the main manifold section or the connecting microchannel. The dimensions of the flow distribution features are preferably chosen such that the pressure drop in the flow distribution feature is at least 2 times the pressure drop in the connecting channels. The flow distribution features increases the overall connecting channel pressure and can thus make the requirement for manifold size for flow distribution small. Furthermore the flow in distribution features is preferably laminar. The pressure drop through the flow distribution feature will vary as (Velocity)$^n$, where n=1. The manifold designed with flow distribution features will be less sensitive to the scale up and scale down flow conditions.

Flow distribution can be used for connecting channels with small or large pressure drop (greater than pressure drop in the main manifold section).

The process channels are preferably microchannels. In some preferred embodiments, the manifolds to which the FDCs connect have microchannel dimensions.

Figure 6:
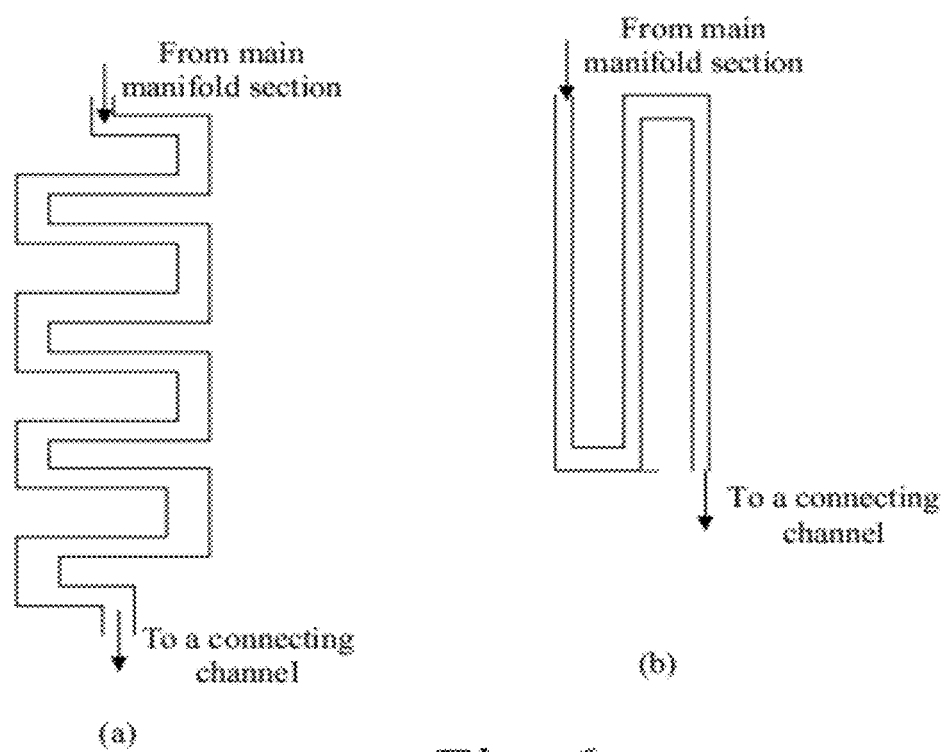
FIG. 6 shows examples of flow distribution feature shapes.

FIG. 6 illustrates a few designs for flow distribution features shapes. FIG. 6a shows 8 turns. The features can be in a 2-dimensional plane or in three dimensions.

All of the following examples are calculated examples.

Example 1

Flow Distribution with Flow Distribution Features

A case study was done to see the improvement in the flow distribution using flow distribution features. The general schematic of the device is shown in FIG. 5 but with a bottom manifold. The top and bottom main manifold sections were 12.7 mm×2.54 mm in cross-section. The connecting channels were 5.08 mm×0.76 mm in dimensions. The length of connecting channels was 127 mm. The connecting channels were separated by 0.508 mm wall. The number of connecting channels was 19. FIG. 4 shows the dimensions of the flow distribution features. The flow distribution features were in serpentine shape. The cross-section of the flow distribution channel was 0.76 mm×0.38 mm. The manifold, flow distribution channels and connecting (process) channels were in a common plane.

Figure 7:
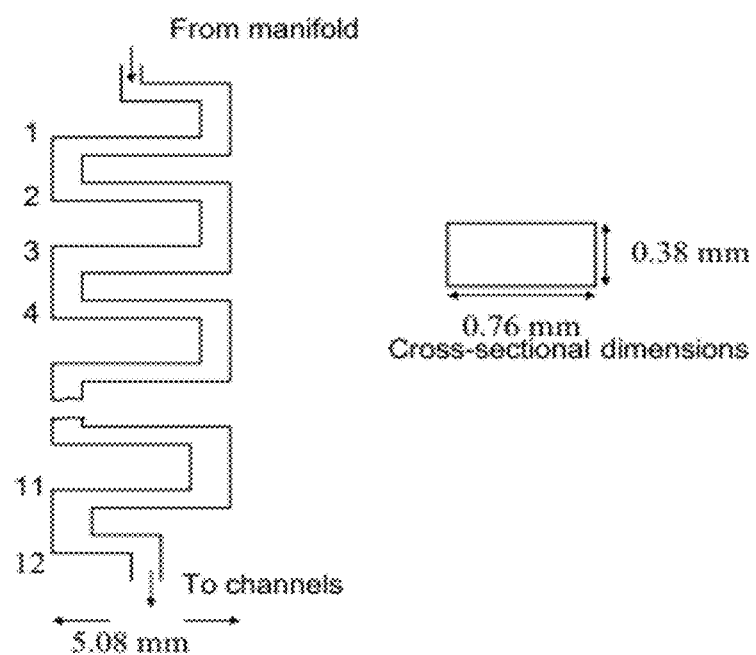
FIG. 7 shows flow distribution feature dimensions in Example 1.
Figure 8:
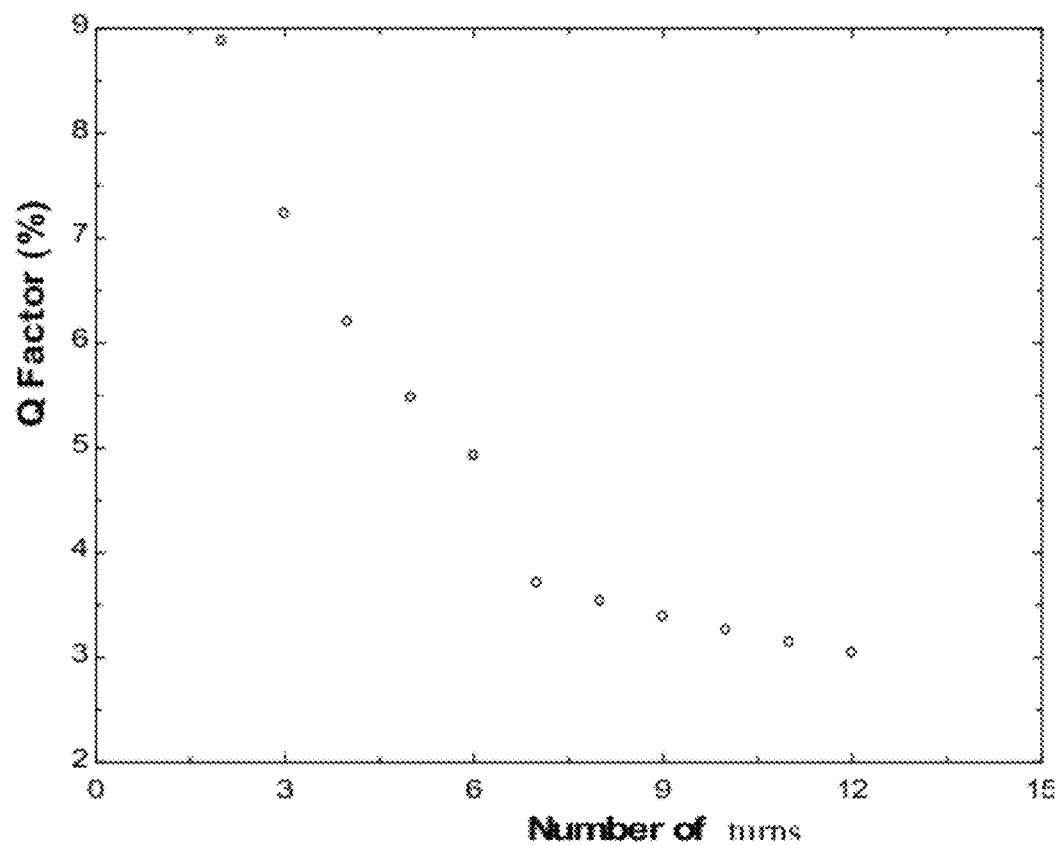
FIG. 8 illustrates the effect of flow distribution feature length on Q factor.

The fluid used was ethylene at 230 psig and −30° C. The total flow rate entering the main manifold section was 0.487 kg/hr. The performance of flow distribution was defined by quality factor as defined below:

$$Q = \frac{\dot{m}_{max} - \dot{m}_{min}}{\dot{m}_{max}} \times 100$$

Where $\dot{m}_{max}$=Maximum mass flow rate in the channel, kg/s
$\dot{m}_{min}$=Minimum mass flow rate in the channel, kg/s
Q=Quality index The pressure drop in the top main manifold section was 0.0005 psi and the pressure drop in the connecting channel was 0.0002 psi. The pressure drop in the flow distribution features was 0.009 psi. For the flow distribution feature design shown in FIG. 7, the Q factor was estimated to be 3.0%. A parametric study was done to see the effect length of flow distribution features on flow distribution. The designed flow distribution features had 12 bends as shown in FIG. 7. To reduce the length of flow distribution feature, the number of bends was decreased in steps and flow distribution was estimated. FIG. 8 shows the effect of number of turns in the flow distribution feature on Q factor.

The pressure drop in connecting channel is of the same order of magnitude as the manifold. As we can see from FIG. 8, as the number of turns in the flow distribution feature increases, flow distribution is improved.

Example 2

Flow Distribution Features Provide Uniform Flow Distribution Over a Wide Range of Turn-Up and Turn-Down Flow Rates from Nominal A geometry the same as in Example 1 was used to show that the flow distribution features provide relatively uniform flow distribution for turn-up and turn-down flow rates. The flow distribution results were compared to the flow distribution obtained in the same geometry but without flow distribution features. The fluid, temperature and outlet pressure conditions were kept for both the cases: with flow distribution feature and without flow distribution features. The fluid used was ethylene at 230 psig and −30° C. The nominal total flow rate entering the main manifold section was 0.487 kg/hr.

Figure 29:
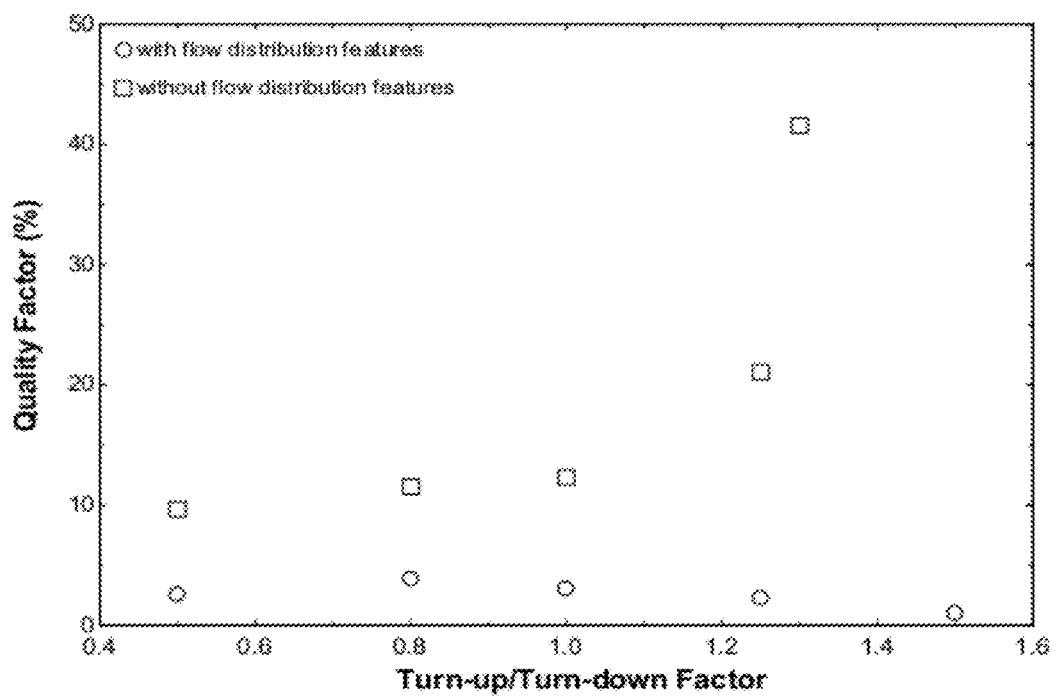
FIG. 29 shows a quality factor comparison with and without flow distribution features.

FIG. 29 shows the quality factors with different turn-up and turn-down factors from nominal flow rates for design with flow distribution features and without flow distribution features. A turn-up/turn-down ratio of 0.8 means 80% of nominal flow rate. A turn-up/turn-down ratio of 1.3 means 130% of nominal flow rate.

As shown in FIG. 29, the flow mal-distribution increases as the flow rate increased above nominal flow rate for case without flow distribution features. The flow distribution remains the same or improves as the flow rate is increased above the nominal flow rate for the case with flow distribution features. The example shows that the flow distribution features provide robustness to the design for turn-up and turn-down flow rates Example 3

Flow Distribution for Emulsion

An emulsion is formed by mixing continuous phase liquid with dispersed phase liquid through a porous medium. It is desired for manufacturing that the porous medium through which continuous and dispersed phases are mixed should be replaceable preferably with mixing of the continuous and dispersed phases while flowing in cross-flow direction. However depending upon the requirement, the continuous and dispersed phases can be mixed while flowing co-current or counter-current to each other.

Figure 9:
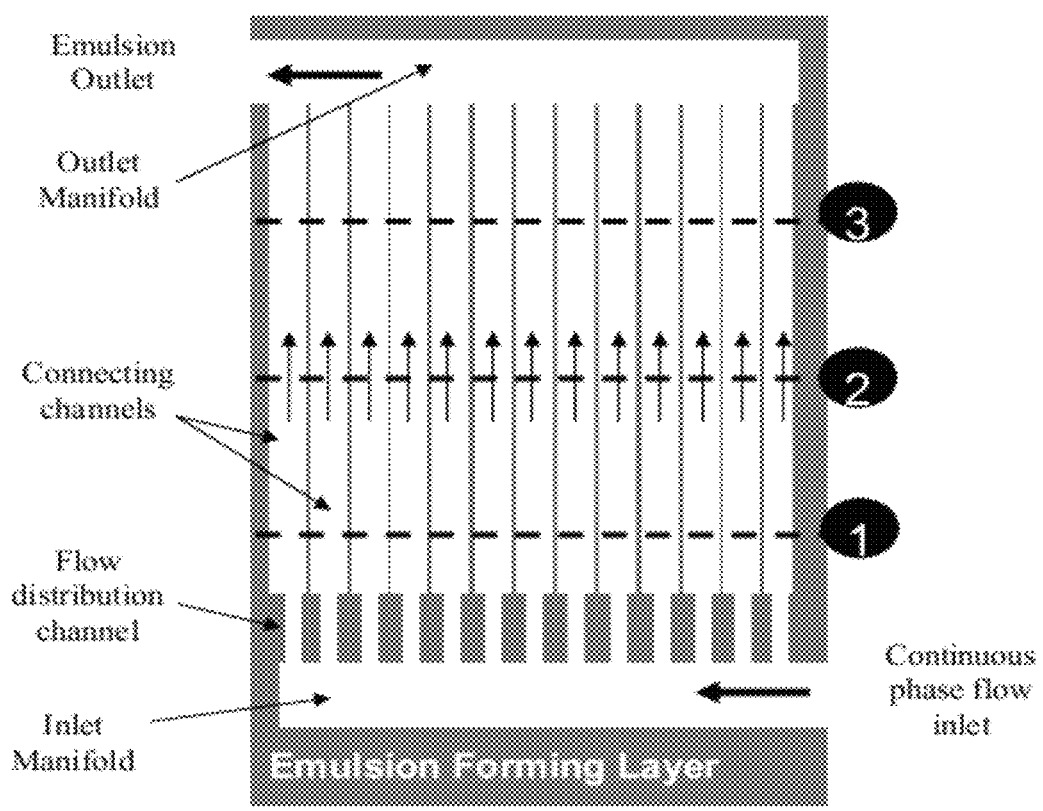
FIG. 9 is a schematic of the first layer of the repeating unit of the device of Example 3.
Figure 10:
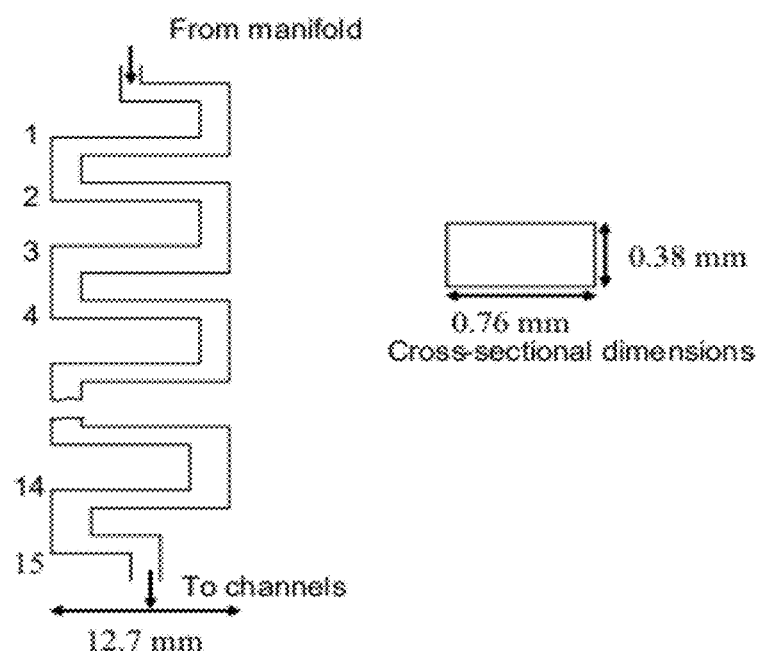
FIG. 10 shows feature dimensions for Example 3.

In this example, only a repeating unit was modeled to describe the performance of the device. The repeating unit has three layers stacked together. The continuous phase enters the first layer as shown in the schematic in the FIG. 9. The flow enters the inlet manifold section. The cross-section of the manifold was 25.4 mm wide×5.08 mm depth. The connecting channel dimensions were 12.7 mm wide×2.03 mm depth× 305 mm length. There were total 16 connecting channels. The rib between the connecting channels was 1.27 mm. The inlet manifold is connected to the connecting (process) channels through flow distribution features. The flow distribution channel dimensions are shown in FIG. 10. In the connecting channels, the dispersed phase is added to the continuous phase to form an emulsion. The emulsion leaves the repeating unit through the outlet manifold as shown in FIG. 9.

The second layer of the repeating unit was porous medium. The porous medium used in this example was Mott Corporation Wicking structure with Media Grade=0.2. The permeability coefficient ($K_L^*$) was 140 and the liquid pressure drop through the medium is given by:

Liquid: Pressure Drop, psi$d=(K_L^*)$(Flux, gpm/ft$^1$) (Visc, cp)(Thck, in.)

Figure 12:
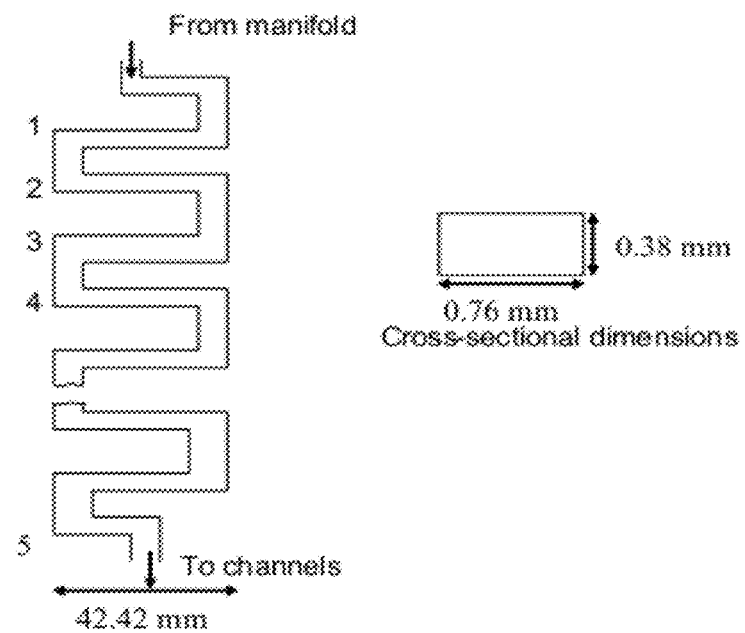
FIG. 12 shows flow distribution feature dimensions in for dispersed phase distribution in Example 3.
Figure 13:
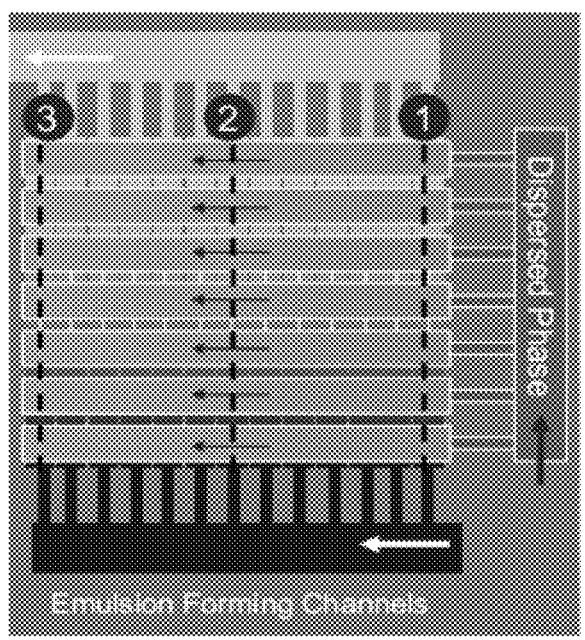
FIG. 13 shows an assembled unit for an emulsion forming microchannel device.

The size of the porous medium was chosen to cover area occupied by the connecting channels in the first layer. The thickness of the porous medium was 0.039". The material specifications for the porous medium as listed below:
Material Specifications
Bubble Point, in. of Hg: 5.0-6.9
Tensile Strength, kpsi: 30.0
Yield Strength, kpsi: 26.0
The dispersed phase enters the third layer of the repeating unit as shown in the FIG. 11. The dispersed phase flow enters into the inlet manifold. The cross-section of the manifold was 12.7 mm wide×5.08 mm depth. The connecting channel dimensions were 42.42 mm wide×1.27 mm depth×222.25 mm long. There were total 7 connecting channels. The rib between the connecting channels was 1.27 mm. The inlet manifold is connected to the connecting channels through flow distribution features. The flow distribution feature dimensions are shown in the FIG. 12. The schematic of assembly of layers of the repeating unit is shown in FIG. 13.

Figure 11:
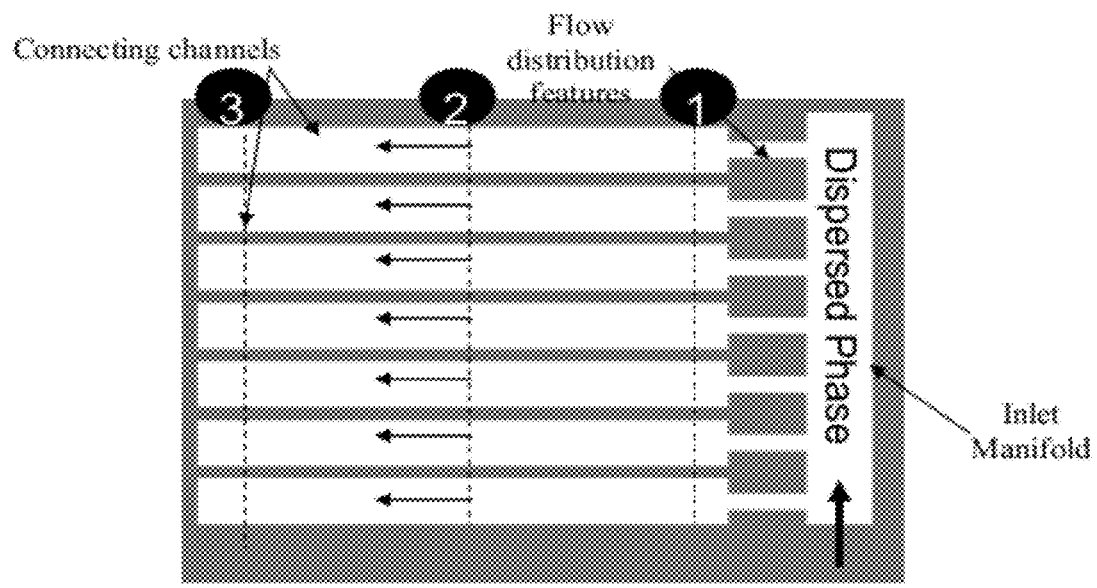
FIG. 11 is a schematic of the third layer of the repeating unit of the device of Example 3
Figure 14:
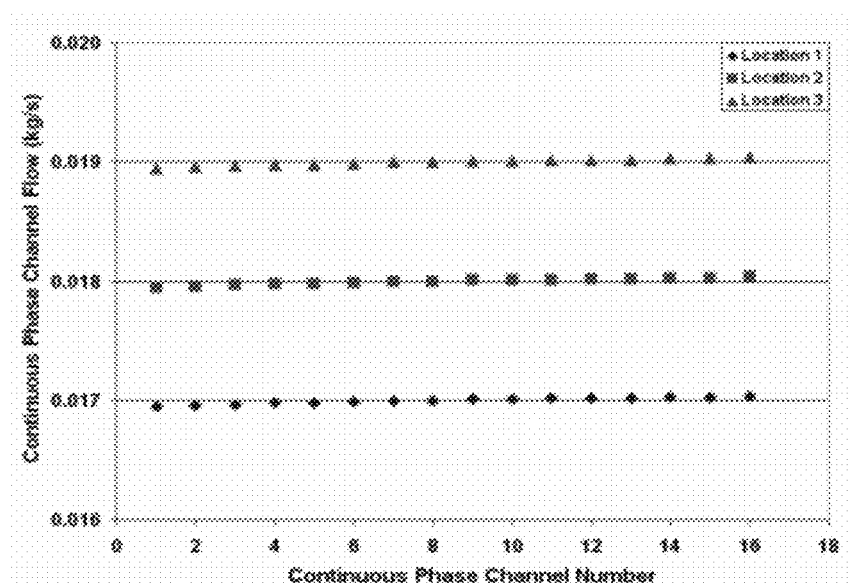
FIG. 14 shows continuous phase flow distribution.
Figure 15:
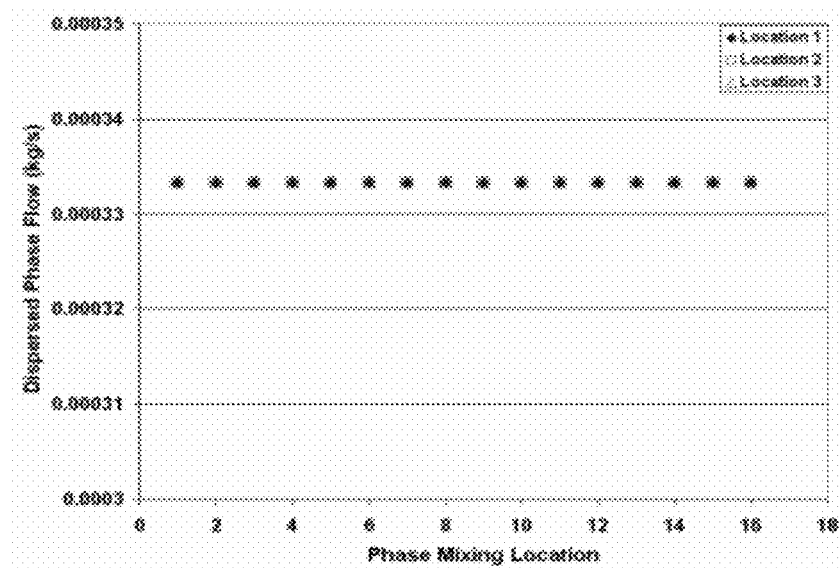
FIG. 15 shows the dispersed phase distribution.

The flow rate of continuous flow rate 1 L/min/connecting channel while the total flow rate of the dispersed phase was 20% of the total flow rate of the continuous phase flow rate. The density and viscosity of continuous phase was 1000 kg/m$^3$ and 1 cP respectively. The density and viscosity of dispersed phase was 850 kg/m$^3$ and 10 cP respectively. The flow uniformity was estimated in continuous phase connecting channels and dispersed phase connecting channels at locations 1, 2 and 3 as shown in FIGS. 9 and 11 respectively (see FIGS. 14 and 15). The flow distribution in continuous phase channel was at location 1 was 0.54% while the flow distribution in dispersed phase channel was at location 1 was 0.03%.

Table 1 shows the comparison of performance in flow distribution with and without flow distribution features

| Performance parameter | With flow distribution feature | Without flow distribution feature |
|---|---|---|
| Dispersed phase flow distribution quality (%) | 0.03% | 0.04% |
| Continuous phase flow distribution quality (%) | 0.54% | 7.3% |
| Total pressure drop in continuous phase (psi) | 633 psi | 605 psi |
| Total pressure drop in dispersed phase (psi) | 54 psi | 4.0 psi |

As we can see from the above table, the flow distribution features do not affect the flow distribution of the dispersed phase. However the flow distribution features improve the flow distribution in the continuous channel which will results in increased uniform emulsion quality. For cases where the changing viscosity as a function of shear rate of a non-Newtonian fluid is considered, the flow maldistribution without the use of flow distribution features is expected to be higher than those described in this example where a shear rate independent viscosity was assumed.

Example 4

Loss Coefficient in Flow Distribution Channels

Figure 16:
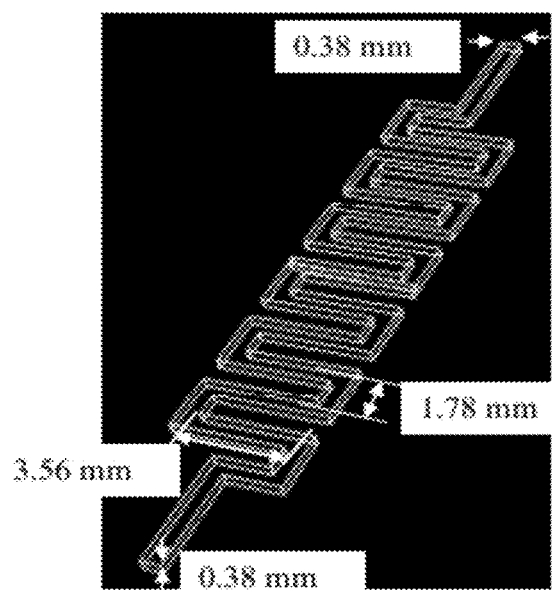
FIG. 16 shows flow distribution feature dimensions in Example 4.

A Computational Fluid Dynamics model was developed in Fluent™ V6.2.16 to simulate a flow distribution feature and estimate the loss coefficient. The fluid used was ethylene vapor. The flow rate was varied such that the Reynolds numbers ranged from laminar to turbulent regimes. The viscosity was assumed to be constant and uniform inlet flow profile was assumed. The flow properties are listed in Table 1. Geometry is as shown in FIG. 16. The cross section of flow distribution feature was 0.38 mm×0.38 mm. The overall width of the feature was 3.56 mm and the smallest distance between two consecutive turns was 1.78 mm. For turbulent flow model, default k-ε model in Fluent™ was used.

This was compared to a literature correlation by Sprenger, H., *Druckverluste in 90 o Krümmem für rechteckrohre*, Schweiz. Baurtg, Vol. 87, no. 13, pp. 223-231, 1969.

It was found that the loss coefficient K decreases as Re is increased from laminar flow to turbulent and turns to an asymptotic value 1.41. It was also found that the first turn always has higher pressure drop (>3.0).

Assumptions and References

A Computational Fluid Dynamics model was developed in Fluent V6.2.16 to simulate a flow distribution feature. The viscosity was assumed to be constant and uniform inlet flow profile was assumed. Geometry is as shown in FIG. 1. The cross section of flow distribution feature was 0.015"×0.0.015". The overall width of the feature was 0.14 mm and the smallest distance between two consecutive turns was 0.07":

The purpose of the study was to estimate the static pressure loss in a turn of a flow distribution feature. Total number of turns defined was 12. The pressure loss was defined as:

$$\Delta P = K_{loss} \frac{\rho v^2}{2}$$

Where $K_{loss}$ is known as the loss coefficient

TABLE 1

Properties of the fluid used for CFD model

| | Ethylene Vapor |
|---|---|
| Density, kg/m³ | 33 |
| Viscosity, kg/m-s | 9.2E-6 |

Figure 17:
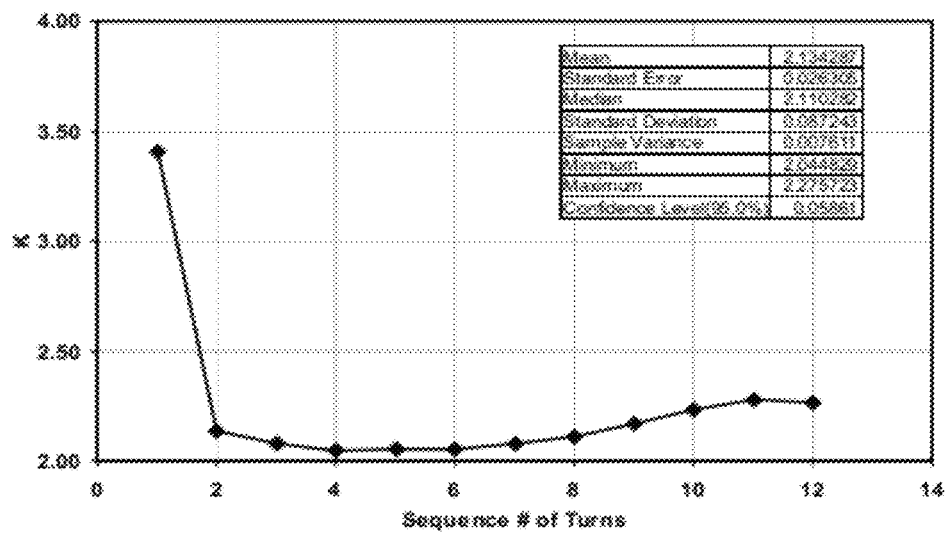
FIG. 17 shows the Loss coefficient at Re=951 in Example 4.
Figure 18:
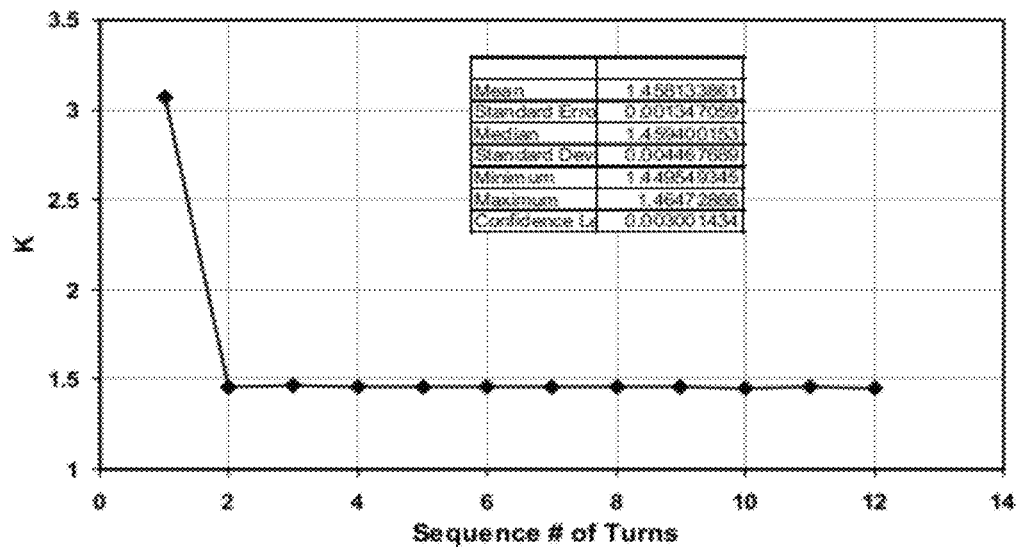
FIG. 18 shows the Loss coefficient at Re=12172 in Example 4.
Figure 19:
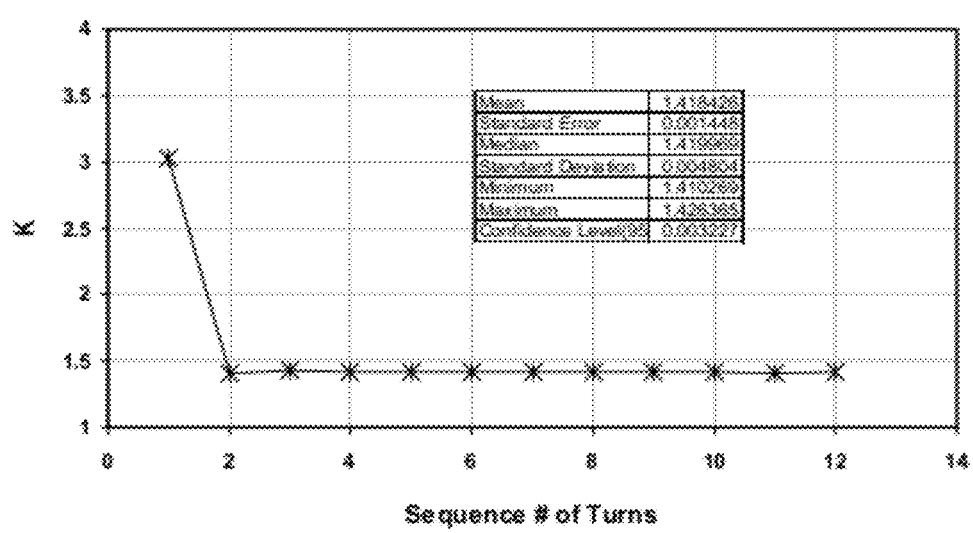
FIG. 19 shows the Loss coefficient at Re=36517 in Example 4.

The CFD model was run for different Reynolds number at the inlet. FIG. 17-19 are examples of one of the few Reynolds numbers that were simulated using CFD model using ethylene vapor as the fluid. FIG. 17-19 shows the loss coefficient at each turn. The loss coefficient at the first turn was significantly higher than the loss coefficient of subsequent turns. This may be attributed to entrance effect. An average loss coefficient was estimated by excluding the turns that exhibited entrance effect and simple averaging the loss coefficient of the remaining turns.

Figure 20:
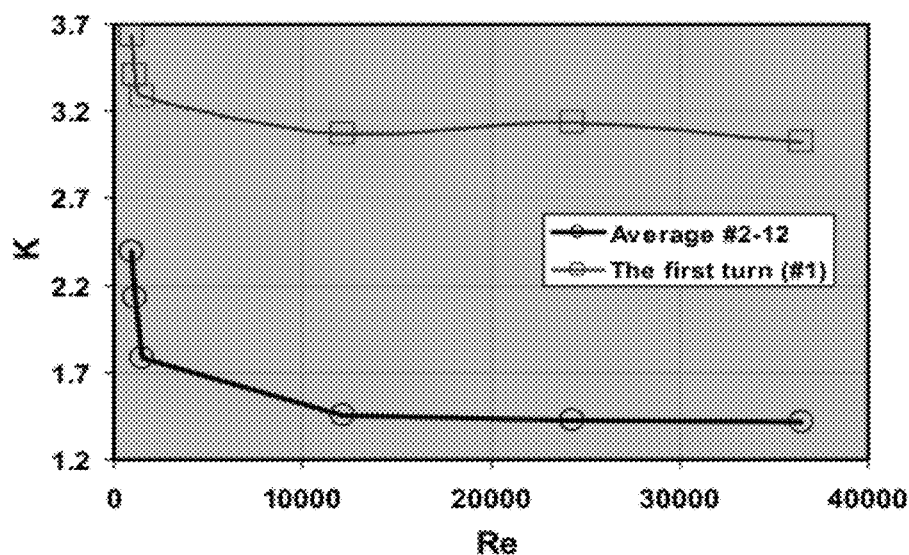
FIG. 20 shows the Loss Coefficient K as Function of Re from CFD in Example 4.

FIG. 20 shows the average turn loss coefficient as a function of Reynolds number. As the Reynolds number is increased, the loss coefficient $K_{loss}$ decreases. In Reynolds number range of turbulent flow (defined as in straight tube), $K_{loss}$ value approaches an asymptotic number 1.41. This finding can be very helpful in designing a flow distribution system using flow distribution features.

Example 5

Calculated Flow Distribution in a Large Scale Phase Separation Device

Pressure drop in the flow distribution feature (shown in Example 4) was estimated from a CFD model using Fluent. The dimensions of the flow distribution feature was same as discussed in Example 4.

Figure 21:
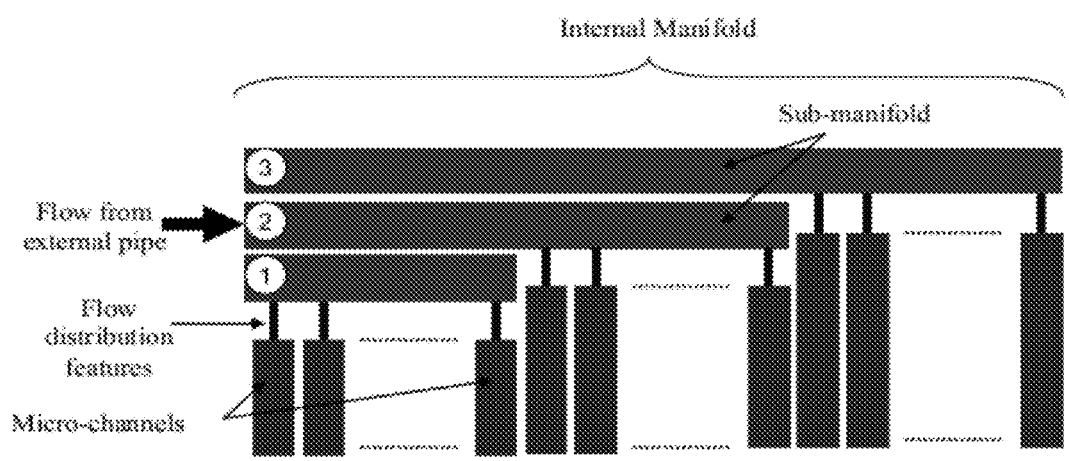
FIG. 21 is a schematic of the device modeled in Example 5.

A schematic of the internal manifold consisted of sub-manifolds and flow distribution features is shown in FIG. 21. Every micro-channel is connected to a sub-manifold by a flow distribution feature. For simplicity, flow distribution features are represented by straight lines in the figure. The uniformity in flow distribution is achieved by designing the flow distribution features appropriately.

The connecting channel pressure drop was assumed to be an average pressure drop of 1 psi. Expansion losses from FDF to connecting channel using conventional sudden expansion correlation as shown below:

$$\Delta P_{exp} = \left[\left(1 - \frac{A_s}{A_l}\right)^2 - 1\right]\frac{G_s^2}{2\rho} + \frac{G_l^2}{2\rho}$$

Figure 22:
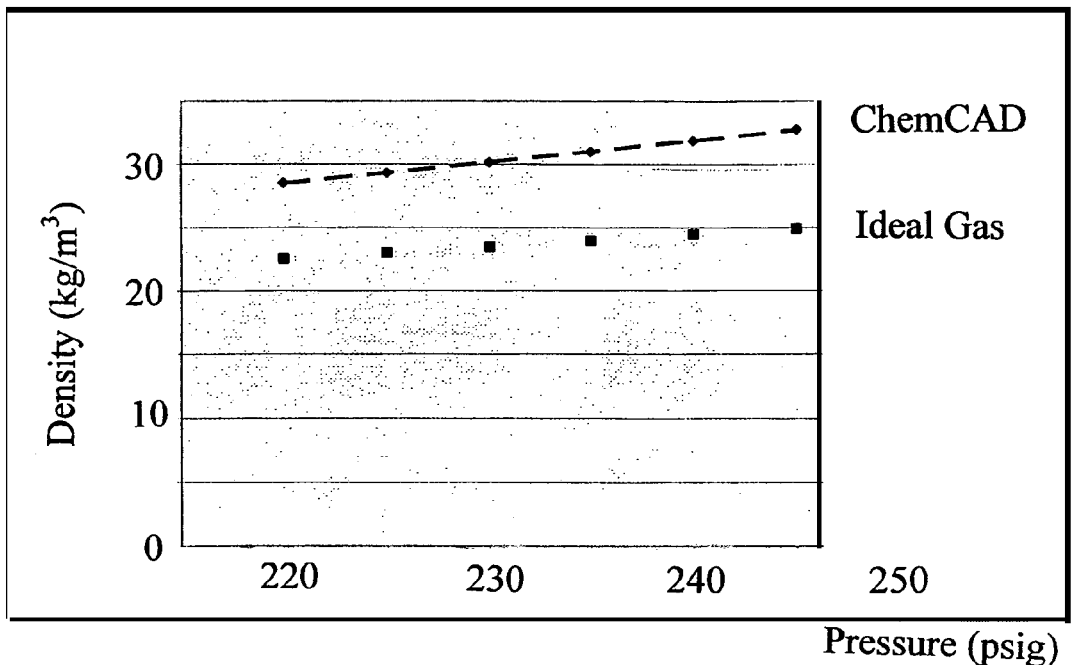
FIG. 22 is a plot of density vs. pressure for Example 5.

The following assumptions were used in the calculations: only the header is modeled (no footer); Constant outlet pressure=230 psig; inlet fluid is 75.5% ethylene, 24.5% ethane gaseous mixture; properties calculated at 245 psig and −26.8° C.; losses at the inlet of the submanifold; no heat transfer in manifold section. Assumptions in 1-D model: total 100 microchannels; constant viscosity; density estimated by curve-fitting density predictions from ChemCAD using SRK equilibrium correlation as shown in FIG. 22.

A numerical model was developed to simulate the flow through the geometry as shown in FIG. 21. The model was based on flow resistances connected in series and parallel. Total number of sub-manifolds in the geometry was 5. Each sub-manifold was connected to 20 microchannels by flow distribution features. The dimensions and number of sub-manifold were arbitrary chosen to show that the flow distribution can be controlled by number of the turns in the flow distribution features. The table below summarizes the dimensions used in the numerical model.

| Geometry Feature | Dimensions |
|---|---|
| Sub-manifolds | |
| Sub-manifold 1 | 20.32 mm × 0.381 mm |
| Sub-manifold 2 | 20.32 mm × 0.381 mm |
| Sub-manifold 3 | 33.02 mm × 0.381 mm |
| Sub-manifold 4 | 33.02 mm × 0.381 mm |
| Sub-manifold 5 | 38.1 mm × 0.381 mm |
| Flow Distribution Feature | |
| Cross-section | 0.76 mm × 0.381 mm |
| Number of turns | Variable |
| Microchannel | |
| Cross-section | 5.08 mm × 0.38 mm |
| Length | N/A (Nominal pressure drop of 1 psi was assumed) |

Figure 23:
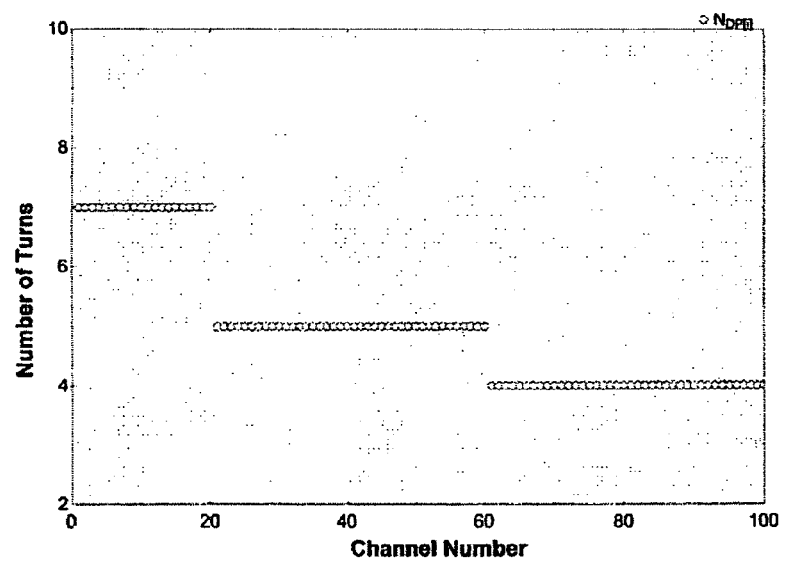
FIG. 23 shows the number of turns in flow distribution features in Example 5.
Figure 24:
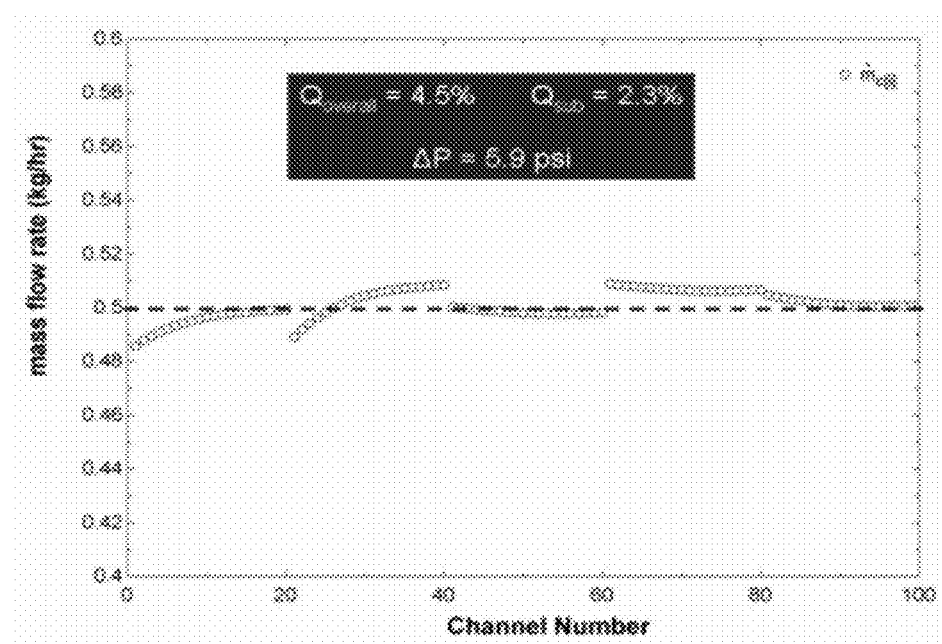
FIG. 24 shows the predicted flow distribution in microchannels in Example 5.

The model was used to estimate number of turns in every flow distribution feature. FIG. 23 shows the requirement for number of turns for flow distribution features. The designed number of turns for flow distribution feature as shown in FIG. 23 gave a Q=4.5% for microchannel. When the definition of Quality Index Factor was applied to flow distribution in sub-manifolds, the Q was 2.3%. The total pressure was estimated to be 5.9 psi. The channel-to-channel flow rate is shown in FIG. 24.

Figure 25:
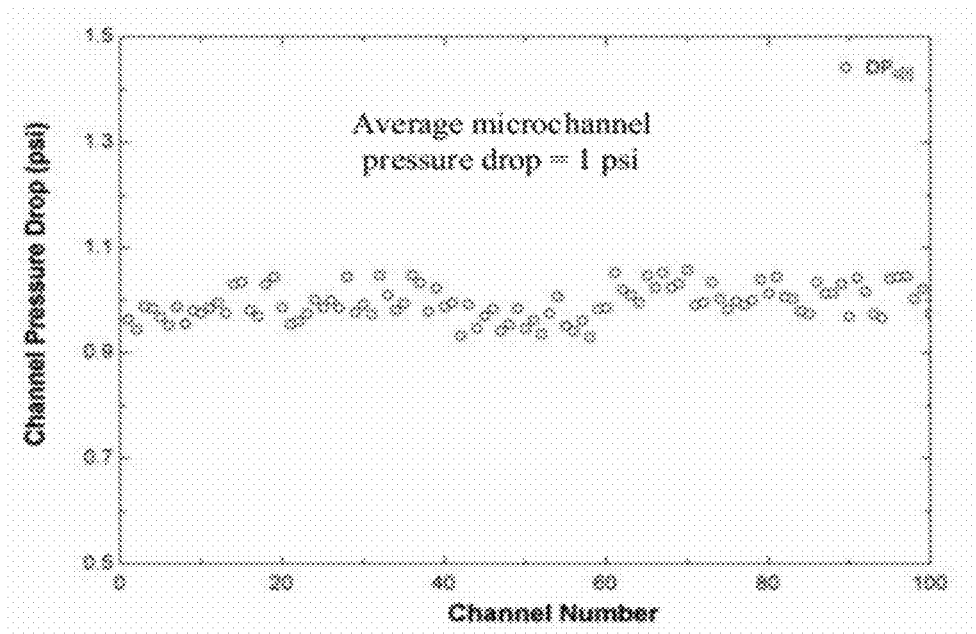
FIG. 25 shows the channel pressure drop variation for the design sensitivity analysis in Example 5.

Many times due to irregularities in the channel geometry, for the same flow rate through the microchannel, the channel pressure drop may vary. The variation in channel pressure drop would lead to mal-distribution. A study was done to see the effect of pressure drop variation in the channel on flow distribution. A ±5% variation in the channel pressure drop was applied in the model. The applied channel pressure drop profile is shown in FIG. 25.

Figure 26:
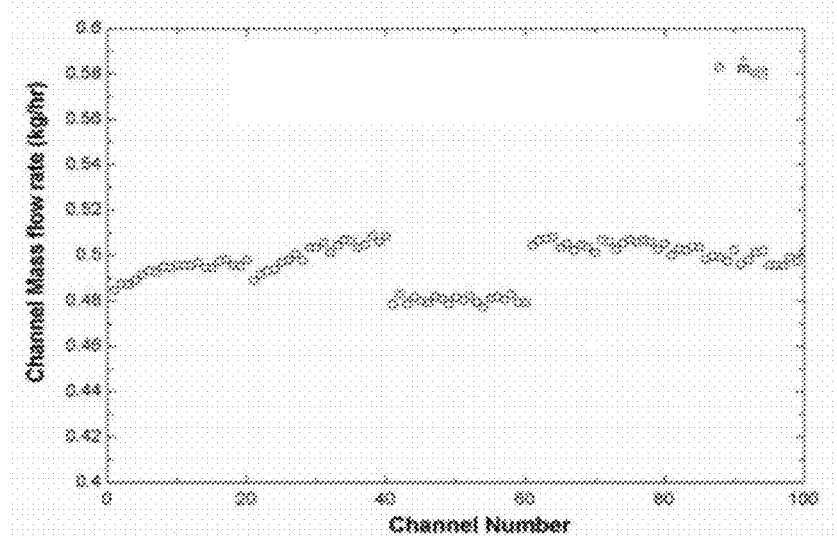
FIG. 26 shows the mass flow distribution for design sensitivity analysis for Example 5.

The Quality Index Factor for microchannel was 6.2% which is very close to flow distribution without channel pressure drop variation. The overall pressure drop was 5.8 psi. The Quality Index Factor for sub-manifold was 4.9%. FIG. 26 shows the mass flow distribution across the microchannels.

The model was run for four more random variation of channel pressure drop with +/−5% variation with average pressure drop of 1 psi. The table below lists the overall Q-factor, sub-manifold Q-factor and overall pressure drop obtained.

| Run No | Overall Q-factor (%) | Sub-manifold Q-factor (%) | Overall Pressure drop (psi) |
|---|---|---|---|
| 1 | 6.2% | 4.9% | 5.8 psi |
| 2 | 6.2% | 4.9% | 5.8 psi |
| 3 | 6.0% | 4.9% | 5.8 psi |
| 4 | 6.5% | 5.0% | 5.8 psi |

The example shows the robustness of the flow distribution design with flow distribution features to pressure variations in the connecting channels.

Example 6

Figure 27:
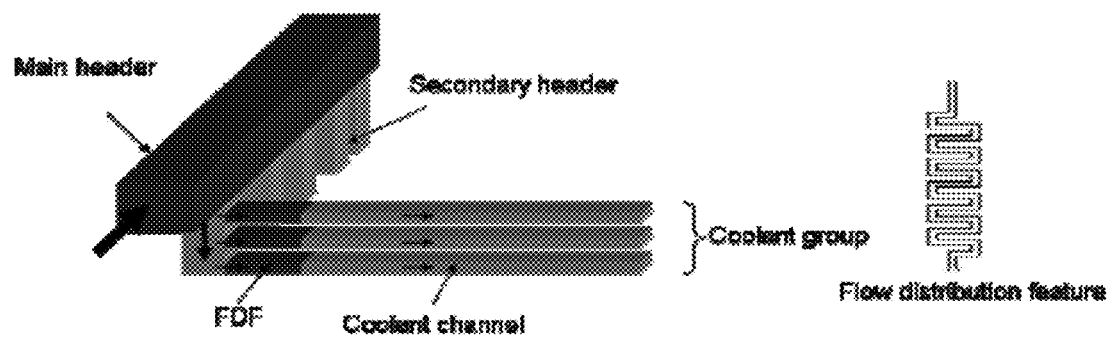
FIG. 27 is a schematic of flow distribution manifold and flow distribution features in Example 6.

Application of Flow Distribution Feature for Partial Boiling in Process Channels A schematic of the flow distribution geometry is shown in FIG. 27. The flow enters the main header which is 19.05 mm×12.7 mm. From the main manifold, the flow is distributed into secondary header. The cross-sectional dimension of the secondary header was 1.78 mm×5.08 mm. The total number of secondary headers was 44. Each secondary header distributes the flow to three connecting coolant channels through flow distribution features. For simple representation, flow distribution feature are shown by straight pathways and are referred as "FDF" in the figure. The connecting channel dimensions were 2.54 mm×0.51 mm×190.5 mm. The cross-section of the flow distribution feature was 0.76 mm×0.25 mm.

Figure 28:
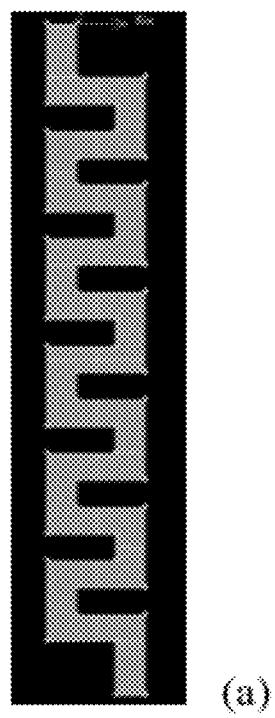
FIG. 28 shows flow distribution features with sharp corner and rounded corner from Example 6.
Figure 28:
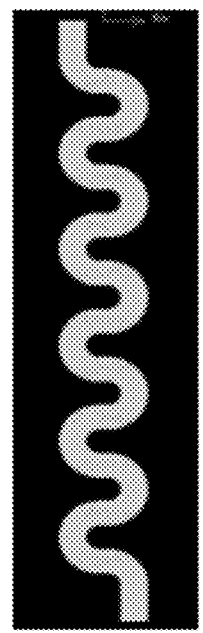

The fluid is water. The total volumetric flow rate entering the main manifold was 2.2 L/min. The temperature of the coolant in the main header, secondary manifold and flow distribution features is 228° C. The pressure at the outlet of coolant channels was such that water at the inlet of coolant channel is at saturated conditions. On the walls of the coolant channels, a varying heat flux is applied. In each secondary header, the center coolant channel, has the heat flux applied to all four walls while the outlet coolant channels have heat flux applied to only one wall. Heat flux profile varies linearly from 1.0 W/cm2 (near flow distribution feature) to 0.25 W/cm2 (near outlet). The heat causes partial boiling in the coolant channel. Two different types of flow distribution features were considered as shown in FIG. 28. The flow distribution feature in FIG. 28(a) was referred as "sharp corner flow distribution feature and the flow distribution features in FIG. 28(b) was referred as "round corner flow distribution features". A CFD was built to determine the loss coefficient as a function of Reynolds number.

The loss coefficient correlation for sharp corner flow distribution feature and round corner flow distribution features as a function of Reynolds number and width of the flow distribution feature is shown below:

$$K_{DP,rounded} = (0.9115814 + 17.246946 W_{FDF} -$$
$$0.00048750521 Re_{FDF} + 5.8078157 \times 10^{-8} Re_{FDF}^2)$$
$$(1 - 8.9274612 W_{FDF} - 0.00025069524 Re_{FDF} +$$
$$2.9785762 \times 10^{-8} Re_{FDF}^2)$$

$$K_{DP,sharp} = (8.2902919 - 291.3301 W_{FDF} - 0.00088695604 Re_{FDF} +$$
$$4705.144 W_{FDF}^2 + 2.894361110^{-8} Re_{FDF}^2 + 0.018871653 W_{FDF} Re_{FDF})$$

The Table below summarizes the flow distribution performance without flow distribution feature and with flow distribution features.

TABLE

Flow distribution performance with partial boiling in the coolant channels

| Number of turns in flow distribution features | Quality Factor (%) | |
| --- | --- | --- |
| | Rounded flow distribution feature | Sharp flow distribution feature |
| <2 | 16.5% | 14.6% |
| 4 | 10.0% | 8.4% |
| 6 | 7.1% | 5.9% |
| 8 | 5.5% | 4.6% |
| 10 | 4.5% | 3.7% |

We can see from the table that the addition of flow distribution features helped improving the flow distribution.

We claim:

1. A method of fluid processing, comprising:
   passing a process stream into a manifold;
   wherein the manifold is connected to at least a first flow distribution channel (FDC) and a second FDC;
   wherein each FDC comprises a series of turns, comprising at least four turns that are 90° or less, or comprising at least two turns that are greater than 90°; and
   wherein the first FDC channel connects the manifold to a first process channel;
   wherein the second FDC channel connects the manifold to a second process channel;
   and wherein the portion of the process stream that flows through the first FDC connects with only one process channel and does not connect with any other FDC so that all of the portion of the process stream that enters the first FDC flows into the first process channel; wherein the pressure drop through the first FDC is at least 2 times greater than the pressure drop through the first process channel that is connected to the first FDC; and
   conducting a unit operation in the first and second process channels; and wherein the unit operation in the first process channel comprises partially boiling a liquid as it passes through the first process channel; and wherein the first and second process channels have at least one internal dimension of 1 cm or less; and
   wherein the first process channel is one of at least 10 parallel process channels connected to the manifold; and
   wherein flow through the at least 10 parallel process channels is characterized by a flow distribution that varies by 10% or less in the absolute overall quality index factor when the flow is turned down by 50%, wherein overall quality index factor=$Q=(M_{max}-M_{min})/M_{max}*100$, wherein $M_{max}$ is maximum mass flow rate in a parallel process channel connected to the manifold and $M_{min}$ is minimum mass flow rate in a parallel process channel connected to the manifold.

2. The method of claim 1 wherein each FDC comprises at least three turns and each of said three turns has an angle of at least 135°.

3. The method of claim 1 where 0.5 to 50% of the process stream entering the first process channel undergoes boiling in the first process channel.

4. The method of claim 1 wherein flow in the first FDC is Newtonian and wherein flow in the first process channel is non-Newtonian.

5. The method of claim 1 wherein the first and second FDCs have the same length.

6. The method of claim 1 wherein the first FDC has a cross-sectional area and the cross-sectional area of the first FDC at all points is less than the cross-sectional area of the first process channel.

7. The method of claim 6 wherein the first FDC channel is on the same plane as the first process channel and the manifold.

8. The method of claim 1 wherein the first process channel has a length that is at least twice as long as the distance from the manifold to the first process channel; and wherein the second process channel has a length that is at least twice as long as the distance from the manifold to the second process channel.

9. The method of claim 8 wherein the first process channel has a length that is at least ten times greater than the distance from the manifold to the first process channel;
   and wherein the second process channel has a length that is at least ten times greater than the distance from the manifold to the second process channel.

10. The method of claim 1 wherein the first and second FDCs have a serpentine shape.

11. The method of claim 1 wherein the first FDC comprises a first cross-sectional area and the first process channel comprises a second cross-sectional area, and wherein the first cross-sectional area is at least 2 times smaller than the second cross-sectional area.

12. The method of claim 1, wherein the device is made up of a plurality of laminae and the first FDC has a three dimensionally tortuous path through multiple layers.

13. The method of claim 1 wherein each of the at least 10 parallel process channels are connected to the manifold via flow distribution channels and wherein each flow distribution channel has serpentine turns.

14. The method of claim 1 wherein each flow distribution channel forms a direct connection between the manifold and a process channel.

15. The method of claim 1 wherein each flow distribution channel forms a direct connection between the manifold and a process channel.

16. A method of fluid processing, comprising:
passing a process stream into a manifold;
wherein the manifold is connected to at least a first flow distribution channel (FDC) and a second FDC;
wherein each FDC comprises a series of turns, comprising at least four turns that are 90° or less, or comprising at least two turns that are greater than 90°; and
wherein the first FDC channel connects the manifold to a first process channel;
wherein the second FDC channel connects the manifold to a second process channel;
and wherein the portion of the process stream that flows through the first FDC connects with only one process channel and does not connect with any other FDC so that all of the portion of the process stream that enters the first FDC flows into the first process channel; wherein the pressure drop through the first FDC is at least 2 times greater than the pressure drop through the first process channel that is connected to the first FDC; and
conducting a unit operation in the first and second process channels; and
wherein the unit operation in the first process channel comprises partially boiling a liquid as it passes through the first process channel;
and wherein the first and second process channels have at least one internal dimension of 1 cm or less; and wherein the first process channel is one of at least 10 parallel process channels connected to the manifold; and
wherein flow through the at least 10 parallel process channels is characterized by a flow distribution that varies by 10% or less in the absolute overall quality index factor when the flow is turned up by 20%, wherein overall quality index factor=$Q=(M_{max}-M_{min})/M_{max}*100$, wherein $M_{max}$ is maximum mass flow rate in a parallel process channel connected to the manifold and $M_{min}$ is minimum mass flow rate in a parallel process channel connected to the manifold.

17. The method of claim 16 where 0.5 to 50% of the process stream entering the first process channel undergoes boiling in the first process channel.

18. The method of claim 16 wherein the first FDC has a cross-sectional area and the cross-sectional area of the first FDC at all points is less than the cross-sectional area of the first process channel.

19. The method of claim 18 wherein the first FDC channel is on the same plane as the first process channel and the manifold.

* * * * *